(12) United States Patent
Jiang (10) Patent No.: US 8,368,266 B2
(45) Date of Patent: Feb. 5, 2013

(54) ELECTRIC POWER STEERING DEVICE (75) Inventor: Chun Hao Jiang, Maebashi (JP)

(73) Assignee: NSK Ltd., Tokyo (JP)

( * ) Notice: Subject to any disclaimer, the term of this patent is extended or adjusted under 35 U.S.C. 154(b) by 699 days.

(21) Appl. No.: 12/594,070

(22) PCT Filed: Mar. 31, 2008

(86) PCT No.: PCT/JP2008/056334
§ 371 (c)(1),
(2), (4) Date: Sep. 30, 2009

(87) PCT Pub. No.: WO2008/132931
PCT Pub. Date: Nov. 6, 2008

(65) Prior Publication Data
US 2010/0148603 A1   Jun. 17, 2010

(30) Foreign Application Priority Data

Apr. 19, 2007   (JP) .................................. 2007-110294

(51) Int. Cl.
*B62D 5/04* (2006.01)
*H02K 5/22* (2006.01)
*H02K 7/116* (2006.01)
*H02K 11/00* (2006.01)

(52) U.S. Cl. ................ 310/71; 310/83; 439/34
(58) Field of Classification Search .................... 310/71, 310/83; 439/34
See application file for complete search history.

(56) References Cited

U.S. PATENT DOCUMENTS

| 8,102,138 B2 * | 1/2012 | Sekine et al. ............... 318/646 |
| 2005/0167183 A1 | 8/2005 | Tominaga et al. |
| 2009/0014231 A1 | 1/2009 | Ebuchi et al. |
| 2009/0120712 A1 * | 5/2009 | Kashimoto et al. ........... 180/444 |

FOREIGN PATENT DOCUMENTS

| EP | 1 920 992 A1 | 5/2008 |
| EP | 1920991 A1 | 5/2008 |
| JP | 2000-166161 A | 6/2000 |
| JP | 2002-127921 A | 5/2002 |
| JP | 2002-331945 A | 11/2002 |

(Continued)

OTHER PUBLICATIONS

International Preliminary Report on Patentability dated Mar. 31, 2008 (five (5) pages).

(Continued)

*Primary Examiner* — Tran N. Nguyen
*Assistant Examiner* — David Scheuermann
(74) *Attorney, Agent, or Firm* — Crowell & Moring LLP (57) ABSTRACT

There is provided an electric power steering device, whereby it is possible to establish an electrical connection between an electric motor and a motor control unit with ease, and it is possible to suppress the electrically connecting portion of the electric motor and the motor control unit from influencing to assembling of any other part. A plate-shaped motor control unit electrically connected with an electric motor 10 is provided at a motor flange 10b of the electric motor, and in addition, a plate-shaped control unit side connection terminal electrically connected with a motor control unit 14 is provided at a motor mounting flange 6b of a housing 6 so as to be in face contact with a motor side connection terminal.

11 Claims, 9 Drawing Sheets

FOREIGN PATENT DOCUMENTS

| | | | |
|---|---|---|---|
| JP | 2005-212722 | A | 8/2005 |
| JP | 2006-166630 | A | 6/2006 |
| WO | WO 2007/007880 | A1 | 1/2007 |
| WO | WO 2007007880 | A1 * | 1/2007 |
| WO | WO 2007/026894 | A1 | 3/2007 |
| WO | WO 2007/043283 | A1 | 4/2007 |
| WO | WO 2007119757 | A1 * | 10/2007 |

OTHER PUBLICATIONS

The Extended European Search Report dated Jul. 18, 2011 (Eight (8) pages).

International Search Report dated Jun. 24, 2008 (two (2) pages).

* cited by examiner

ELECTRIC POWER STEERING DEVICE

TECHNICAL FIELD

The present invention relates to electric power steering devices that assist a steering operation of an automobile.

BACKGROUND ART

As an electric power steering device that assists the steering operation of an automobile, an example thereof is described in Patent Document 1 such that the electric power steering device includes: a housing having therein a worm gear mechanism that transmits rotary torque of an electric motor to a steering shaft, as a steering assist force; and a motor control unit that controls the electric motor. However, in the electric power steering device described in Patent Document 1, since the electric motor and the motor control unit (ECU) are electrically connected via external wiring such as a harness, the electrical connection work has to be conducted separately from the assembling work of the electric motor or that of the motor control unit. This causes a drawback of poor workability.

Accordingly, there is another proposal of forming a plate-shaped connection terminal of the motor control unit to be integrally attached to the electric motor, and then forming a contact surface at the plate-shaped connection terminal so as to be in face contact with a connection terminal of the electric motor (see Patent Document 2).

Patent Document 1: JP 2002-127921 A
Patent Document 2: JP 2006-166630 A

It should be noted that, however, the electric motor and the motor control unit are electrically connectable without the provision of the external wiring such as a harness, in the electric power steering device disclosed in Patent Document 2. However, the contact surface formed at the plate-shaped connection terminal of the motor control unit protrudes on the electric motor side from the surface, where the motor is installed, provided in the motor control unit. It is therefore necessary to separately arrange a space for causing the connection terminal on the motor side to be in face contact with the connection terminal on the control unit side. This causes a drawback of increasing an occupied space. There is another drawback of necessitating a cover for covering the plate-shaped connection terminal of the control unit in order to prevent short-circuit between the terminals or prevent the adhesion of dusts. This also leads to further another drawback of increasing the number of parts.

The present invention has been made in view of the above-described drawbacks, and has an object of providing an electric power steering device whereby an electric motor and a motor control unit are electrically connected with ease and the electrical connection between the electric motor and the motor control unit is suppressed from influencing to assembling of any other part.

DISCLOSURE OF THE INVENTION

According to an aspect of the present invention, there is provided an electric power steering device comprising: a housing having therein a worm gear mechanism that transmits rotary torque of an electric motor to a steering shaft, as a steering assist force; a motor control unit that controls the electric motor; and a motor flange that fastens the electric motor to a motor mounting flange arranged at the housing with a plurality of motor mounting bolts, wherein a motor side connection terminal to be electrically connected to the electric motor is provided at the motor flange, and wherein a control unit side connection terminal to be electrically connected to the motor control unit is provided at the motor mounting flange so as to be in face contact with the motor side connection terminal.

In the above configuration, the motor side connection terminal is arranged at the motor flange so as not to protrude from a housing side end surface of the motor flange.

In addition, the control unit side connection terminal is arranged at the motor mounting flange so as not to protrude from a motor side end surface of the motor mounting flange.

Further, an insulating body that electrically insulates the motor flange from the motor side connection terminal is provided at the motor flange, and another insulating body that electrically insulates the motor mounting flange from the control unit side connection terminal is provided at the motor mounting flange.

In addition, a bolt insertion through hole, through which the motor mounting bolt is inserted, is provided at the motor side connection terminal, and a through hole is provided at the control unit side connection terminal so that the motor mounting bolt that is inserted through the bolt insertion through hole is screwed into a nut buried in the motor mounting flange.

Furthermore, any one of the motor side connection terminal and the control unit side connection terminal is arranged to be movable in axial direction of the electric motor.

Moreover, the control unit side connection terminal and the nut are arranged to be movable in axial direction of the electric motor.

BRIEF DESCRIPTION OF THE DRAWINGS

FIG. 10A and FIG. 10B are views illustrative of operation and effect of the electric power steering device according to the first embodiment of the present invention, FIG. 11A and FIG. 11B are views illustrative of a second embodiment of the present invention.

BEST MODE FOR CARRYING OUT THE INVENTION

Embodiments of the present invention will now be described with reference to the drawings.

Figure 1:
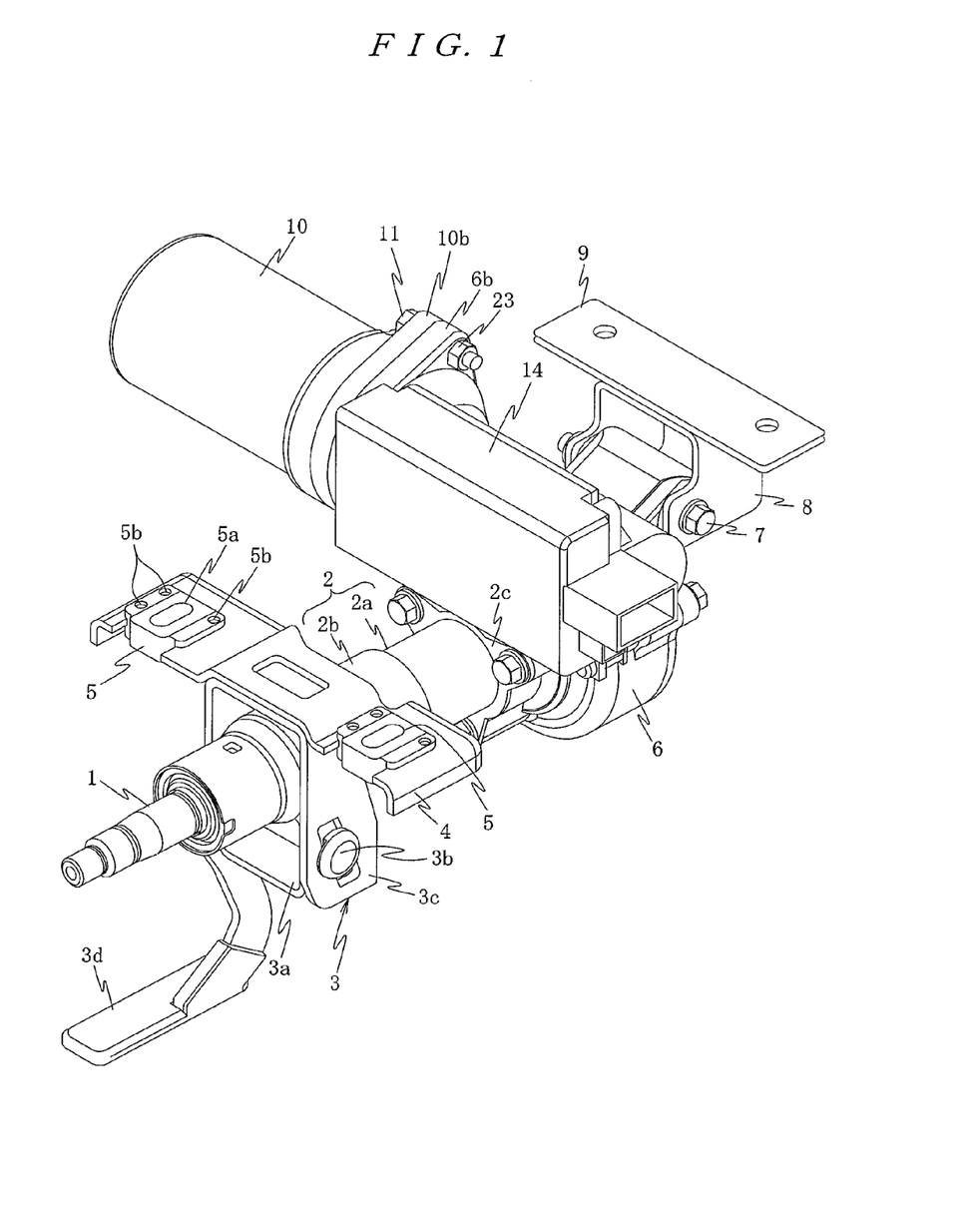
FIG. 1 is an oblique perspective view of an electric power steering device according to a first embodiment of the present invention.
Figure 2:
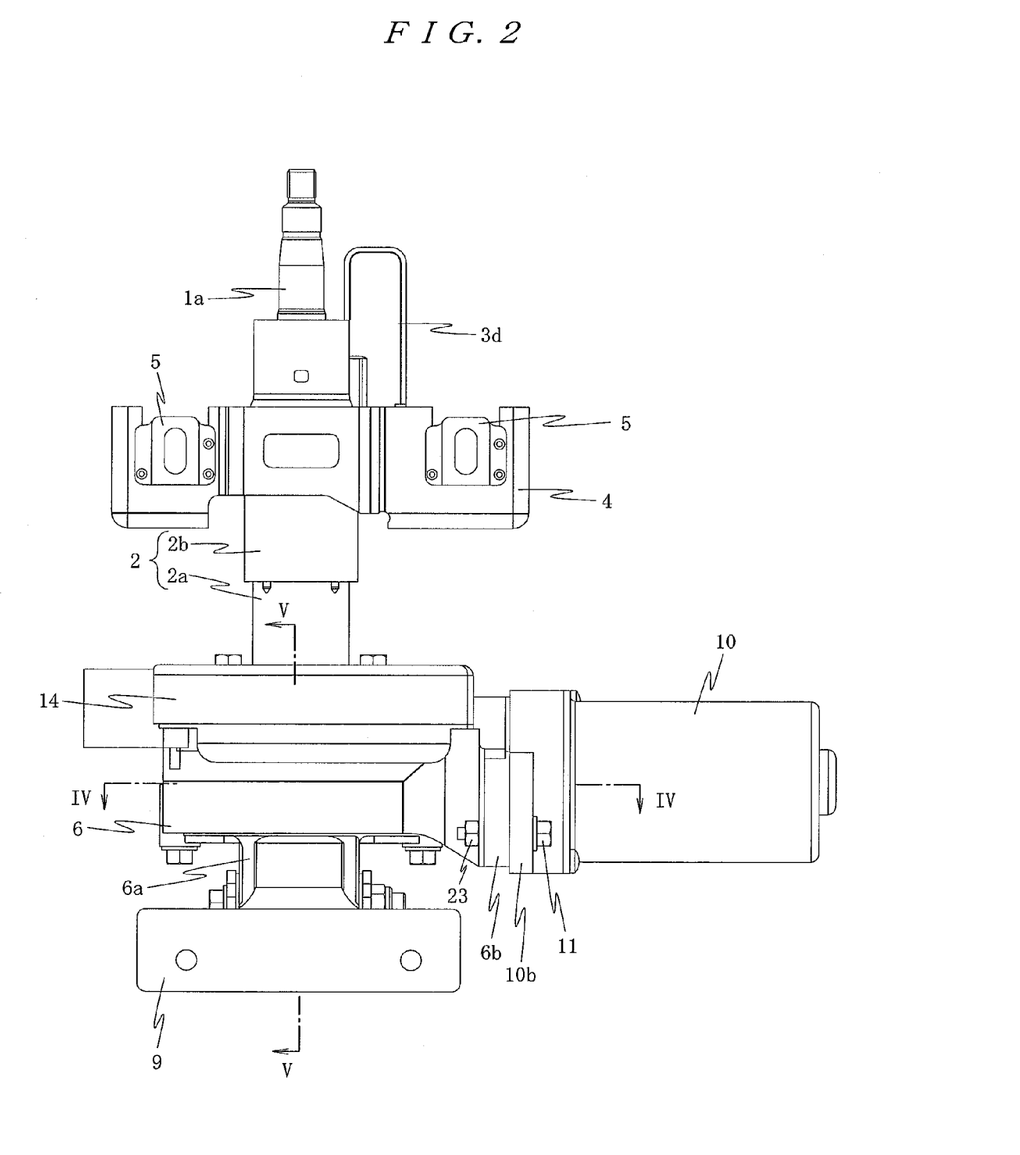
FIG. 2 is a front view of the electric power steering device illustrated in FIG. 1.
Figure 3:
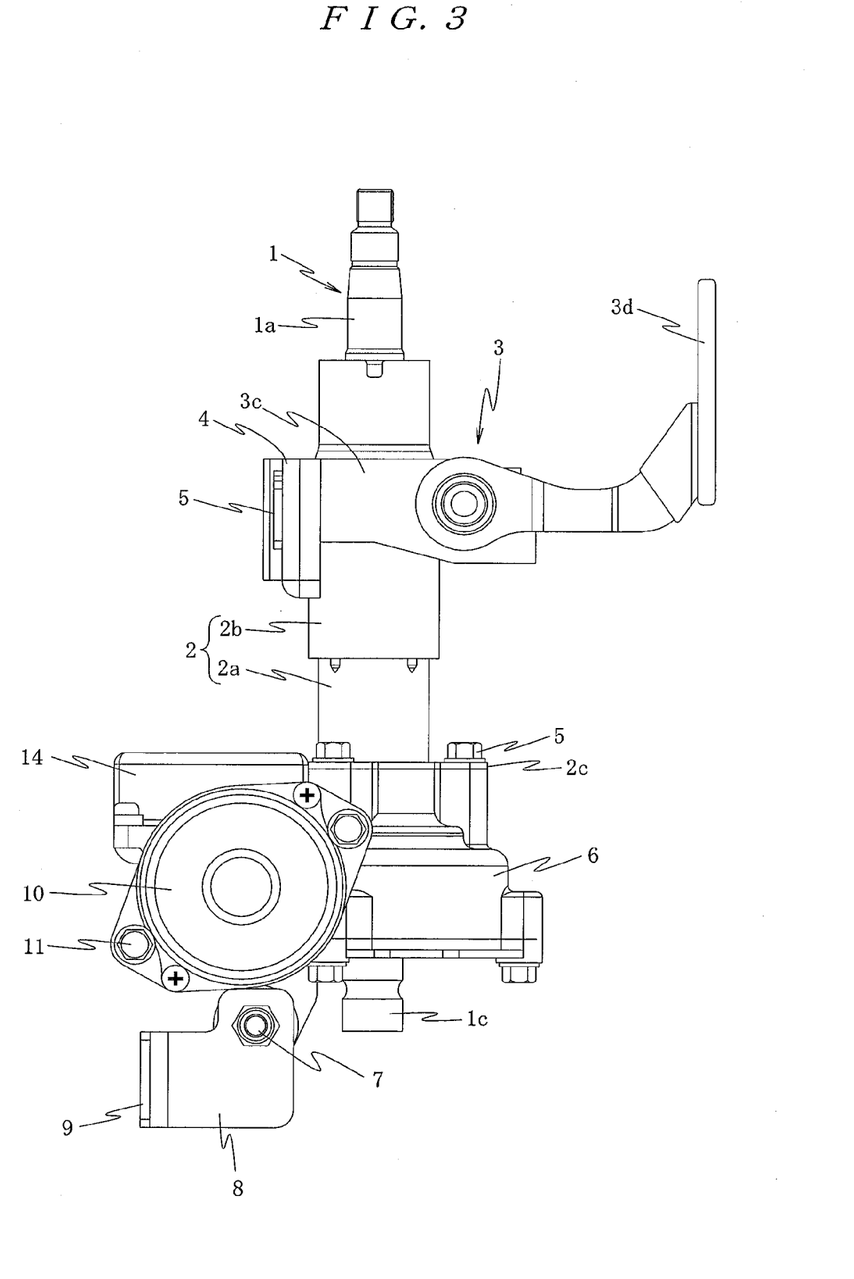
FIG. 3 is a right side view of the electric power steering device illustrated in FIG. 2.
Figure 4:
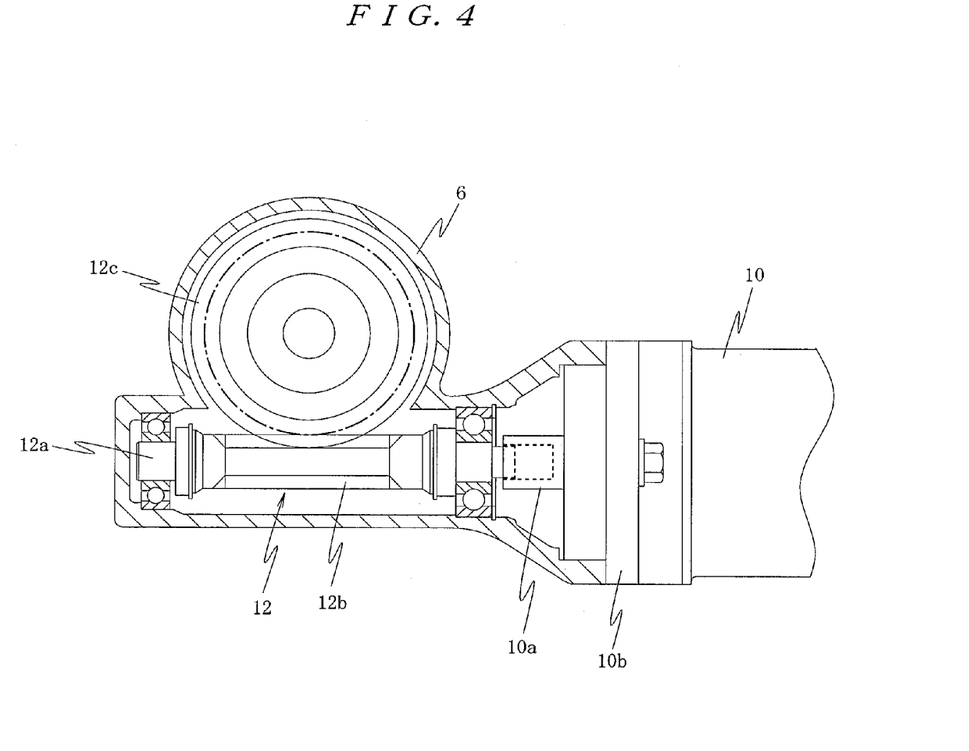
FIG. 4 is a cross-sectional view taken along line IV-IV of FIG. 2.
Figure 5:
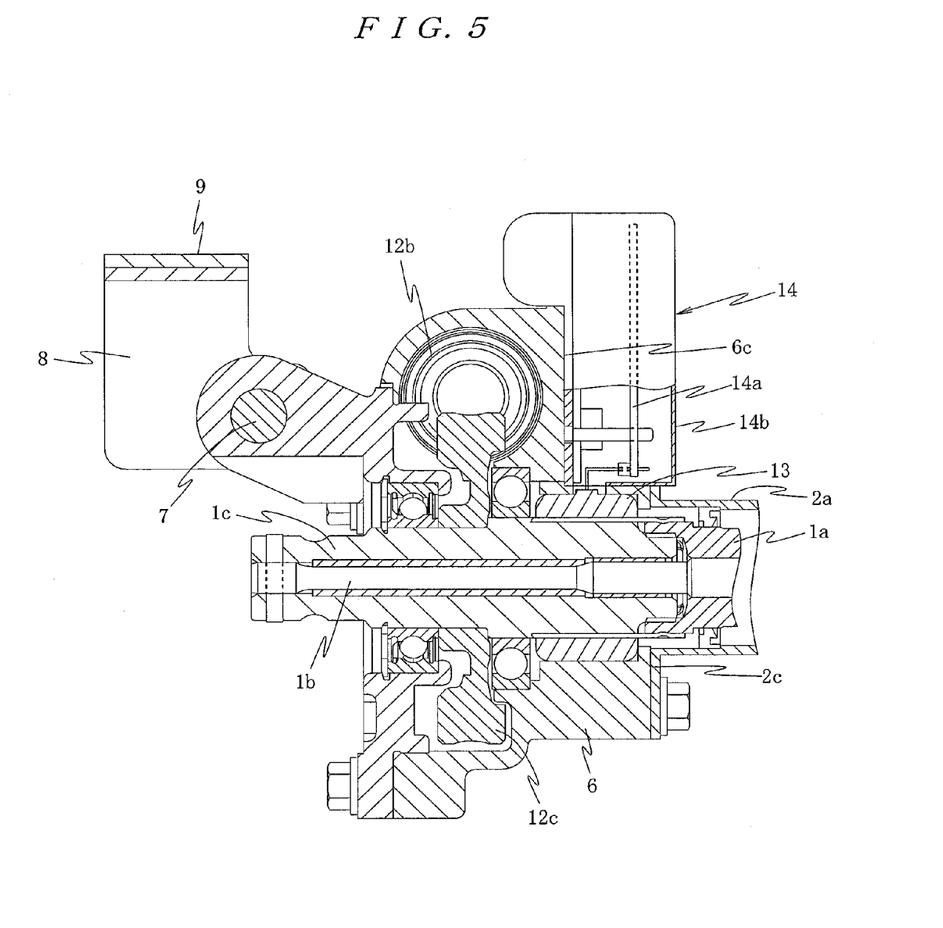
FIG. 5 is a cross-sectional view taken along line V-V of FIG. 2.
Figure 6:
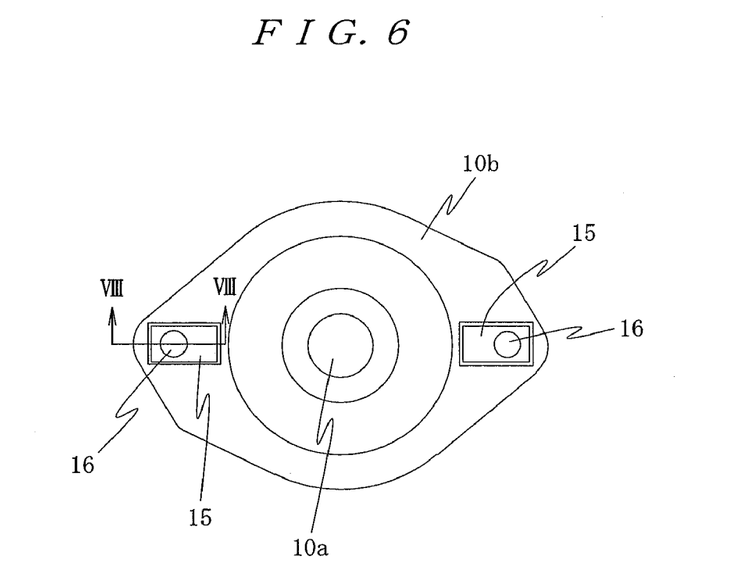
FIG. 6 is a front view of an electric motor illustrated in FIG. 2.
Figure 7:
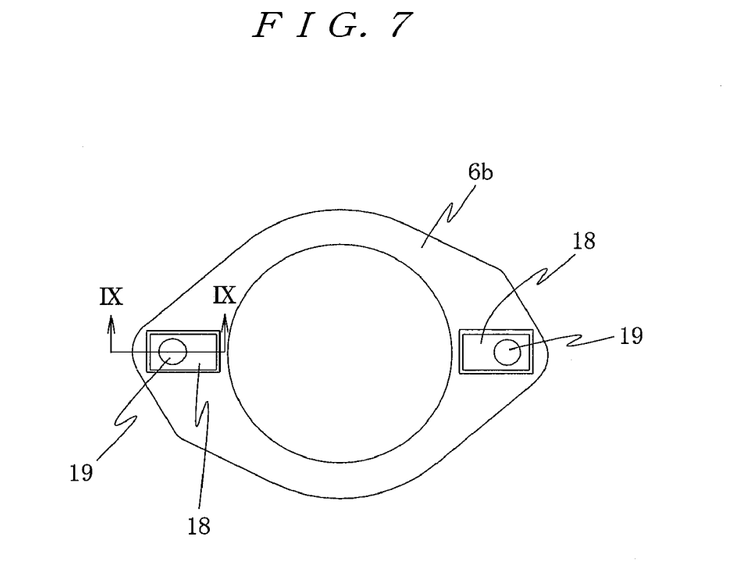
FIG. 7 is a view illustrative of a motor-mounting flange illustrated in FIG. 2, when viewed from the electric motor side.
Figure 8:
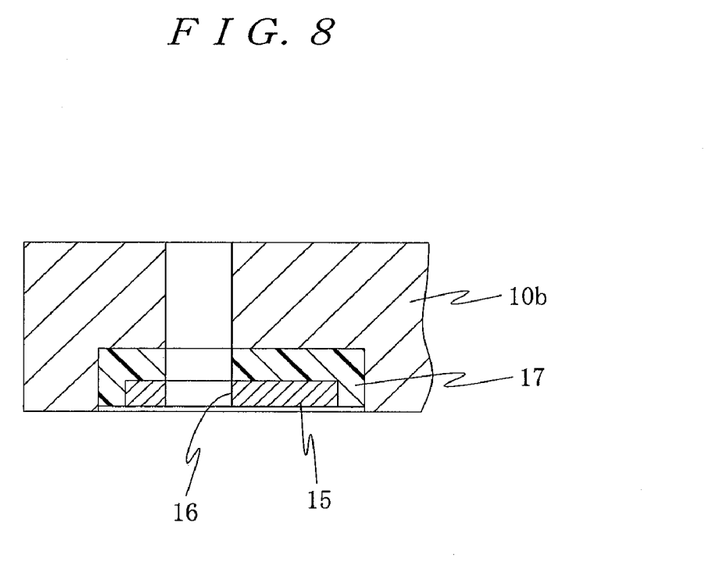
FIG. 8 is a cross-sectional view taken along line VIII-VIII of FIG. 6.
Figure 9:
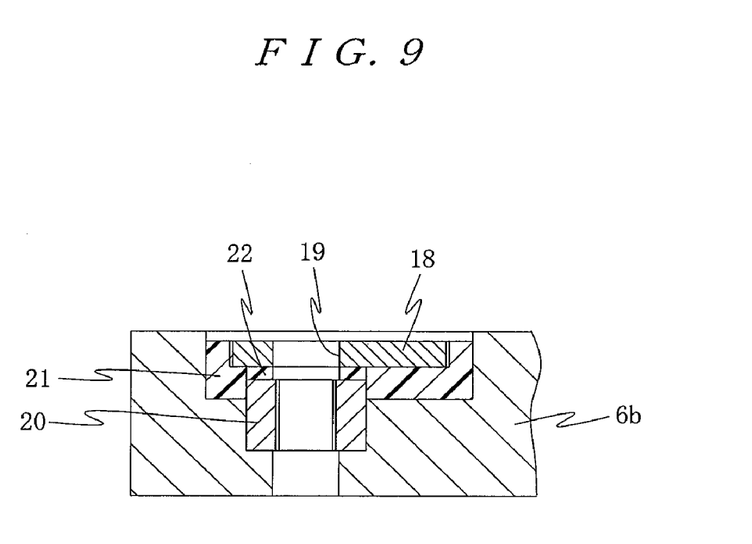
FIG. 9 is a cross-sectional view taken along line IX-IX of FIG. 7.

FIG. 1 is an oblique perspective view of an electric power steering device according to a first embodiment of the present invention. FIG. 2 is a front view of the electric power steering device illustrated in FIG. 1. FIG. 3 is a right side view of the electric power steering device illustrated in FIG. 2. FIG. 4 is a cross-sectional view taken along line IV-IV of FIG. 2. FIG. 5 is a cross-sectional view taken along line V-V of FIG. 2. FIG. 6 is a front view of an electric motor illustrated in FIG. 2. FIG. 7 is a view illustrative of a motor-mounting flange illustrated in FIG. 2, when viewed from the electric motor side. FIG. 8 is a cross-sectional view taken along line VIII-VIII of FIG. 6. FIG. 9 is a cross-sectional view taken along line IX-IX of FIG. 7. As illustrated in FIG. 1 to FIG. 3, the electric power steering device according to the first embodiment of the present invention is provided with: a steering shaft 1; a column tube 2; a tilt mechanism 3; separation capsules 5; a housing 6; a column supporting bracket 8; an electric motor 10; and a motor control unit 14.

The steering shaft 1 is composed of: an input shaft 1a (see FIG. 2), an upper end portion of which is coupled to a steering shaft, not illustrated; and an output shaft 1c coupled to a lower end portion of the input shat 1a via a torsion bar 1b (see FIG. 5). The column tube 2 having a double tube structure including: an inner tube 2a; and an outer tube 2b is attached to the outer circumference of the input shat 1a and that of the output shaft 1c.

The inner tube 2a of the column tube 2 has a housing mounting flange 2c at a lower end portion, so the housing 6 is attached to the housing mounting flange 2c. Meanwhile, the outer tube 2b of the column tube 2 is movable in the axial direction of the inner tube 2a, and the tilt mechanism 3 for performing a tilt operation of the column tube 2 is provided at the outer tube 2b.

The tilt mechanism 3 is provided with: a swinging bracket 3a, having a letter C shape, secured by welding or the like to the outer circumferential surface of the external tube of the column tube 2; and a securing bracket 3c, having a letter C shape, coupled to the swinging bracket 3a via a pivot 3b. A tilt lever 3d is attached to the pivot 3b.

The securing bracket 3c of the tilt mechanism 3 is secured to a bracket mounting plate 4 by spot welding or the like, and a pair of left and right separation capsules 5 are attached to the bracket mounting plate 4.

The separation capsules 5 are formed by die casting aluminum, and each of the separation capsules 5 is provided with a capsule mounting opening 5a (see FIG. 1) for mounting the separation capsule 5 onto a vehicle side part (not illustrated) with mounting bolts, not illustrated. In addition, each separation capsule 5 is provided with three resin injection openings 5b communicated with resin injection openings (not illustrated) arranged at the bracket mounting plate 4, so the separation capsule 5 is secured to the bracket mounting plate 4 by the resin injected into the resin injection openings 5b. Accordingly, if an impact force generated at a secondary collision is exerted onto the outer tube 2b of the column tube 2, the resin injected into the resin injection openings 5b of the separation capsule 5 will be damaged on reception of the shearing force and then the outer tube 2b of the column tube 2 will be moved to the inner tube 2a side.

The housing 6 has a coupling portion 6a (see FIG. 2) at a lower end portion, so that the column supporting bracket 8 is coupled to the coupling portion 6a via a coupling shaft 7. In addition, the housing 6 has a motor mounting flange 6b, so the electric motor 10, which is a source of generating the steering assist force, is attached to the motor mounting flange 6b by multiple motor securing bolts 11 and motor securing nuts 23 to be screwed with the bolts (see FIG. 1 and FIG. 2). Furthermore, the housing 6 is formed by die casting a metallic material with high heat conductivity (such as aluminum, aluminum alloy, magnesium, magnesium alloy, or the like). The housing 6 has therein: a worm gear mechanism 12 (see FIG. 4) that transmits the rotary torque of the electric motor 10 to the output shaft 1c of the steering shaft 1, as a steering assist force; and a torque sensor 13 (see FIG. 5) that detects the steering torque generated at the steering shaft 1. Moreover, the housing 6 has a control unit mounting surface 6c (see FIG. 5) in the vicinity of the motor mounting flange 6b, so the motor control unit 14 that controls the electric motor 10 is mounted on the control unit mounting surface 6c.

The column supporting bracket 8 is secured to a vehicle side member, not illustrated, by a bracket mounting plate 9. Accordingly, when the tilt lever 3d of the tilt mechanism 3 is operated, the column tube 2 is tilted with respect to the coupling shaft 7 as a center.

The electric motor 10 has an output shaft 10a (see FIG. 4), so a worm shaft 12a of the worm gear mechanism 12 is coupled to an end edge portion of the output shaft 10a. The electric motor 10 is also provided with a motor flange 10b (see FIG. 2) to be joined with the motor mounting flange 6b of the housing 6. Two motor side connection terminals 15 (see FIG. 6) electrically connected to the electric motor 10 are securely installed on a housing side end surface of the motor flange 10b so as not to protrude from the housing side end surface of the motor flange 10b.

The motor control unit 14 has: a control board 14a (see FIG. 5); and a board protection cover 14b that covers the control board 14a. The control board 14a is electrically connected to two control unit side connection terminals 18 (see FIG. 7) arranged at the motor mounting flange 6b of the housing 6.

The motor side connection terminal 15 is made of a metallic plate, such as a copper plate. The motor side connection terminal 15 is provided with a bolt insertion through hole 16 through which the motor securing bolt 11 is inserted. The bolt insertion through hole 16 is made to have a diameter greater than that of the motor securing bolt 11 so that the bolt insertion through hole 16 and the motor securing bolt 11 should be spaced apart from each other to have a given distance or more and maintain a non-contact state with certainty. Additionally, an insulating body 17 (see FIG. 8) that electrically insulates the motor side connection terminal 15 from the motor flange 10b is buried in the motor flange 10b of the electric motor 10.

The control unit side connection terminal 18 is made of a metallic plate such as a copper plate, as with the motor side connection terminal 15. Through holes 19 through which the motor securing bolts 11 penetrate are arranged at the control unit side connection terminals 18, respectively. The through hole 19 is made to have a diameter greater than that of the motor securing bolt 11 so that the through hole 19 and the motor securing bolt 11 should be spaced apart from each other to have a given distance or more and maintain a non-contact state with certainty. In addition, the control unit side connection terminal 18 is electrically insulated from the motor mounting flange 6b by an insulating body 21 buried in the motor mounting flange 6b. Furthermore, the control unit side connection terminal 18 is arranged at the motor mounting flange 6b so as not to protrude from the motor side end surface of the motor mounting flange 6b. Nuts 20 for terminal pressure contact (FIG. 9) to be screwed with the motor securing bolts 11, respectively, are buried in the motor mounting flange 6b with their rotations stopped. The nut 20 for terminal pressure contact is fit into, for example, a hexagon hole arranged at the motor mounting flange 6b to be movable in the axial direction of the electric motor 10 (in the thickness direction of the motor mounting flange 6b), and an insulating washer 22 is interposed between the control unit side connection terminal 18 and the nut 20 for terminal pressure contact.

Incidentally, the worm gear mechanism 12 is composed of: the worm shaft 12a; and a worm wheel 12c to be geared with a worm 12b arranged at the worm shaft 12a.

Figure 10A:
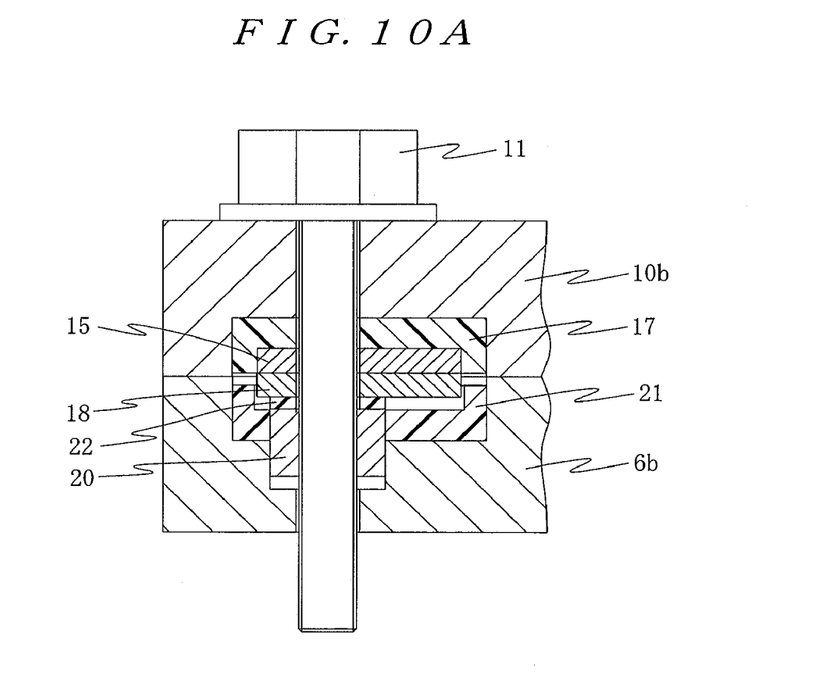
FIG. 10A is a view illustrative of a state where a control unit side connection terminal is in pressure contact with a motor side connection terminal.

In such a configuration, after the motor securing bolts 11 are inserted into the bolt insertion through holes 16 arranged at the motor side connection terminal 15 and the through holes 19 arranged at the control unit side connection terminal 18, respectively, each of the motor securing bolts 11, which is inserted through the bolt insertion through holes 16 of the motor side connection terminals 15 and the through holes 19 of the control unit side connection terminals 18, is screwed into the nut 20 for terminal pressure contact, buried in the motor mounting flange 6b of the housing 6. Then, as illustrated in FIG. 10A, the nut 20 for terminal pressure contact, and the insulating washer 22 are moved to the electric motor side. This causes the control unit side connection terminal 18 to move to the electric motor side and protrude from the motor side end surface of the motor mounting flange 6b. The control unit side connection terminals 18 is brought into face contact with the motor side connection terminal 15 arranged at the motor flange 10b of the electric motor 10, thereby electrically connecting the electric motor 10 and the motor control unit 14.

Figure 10B:
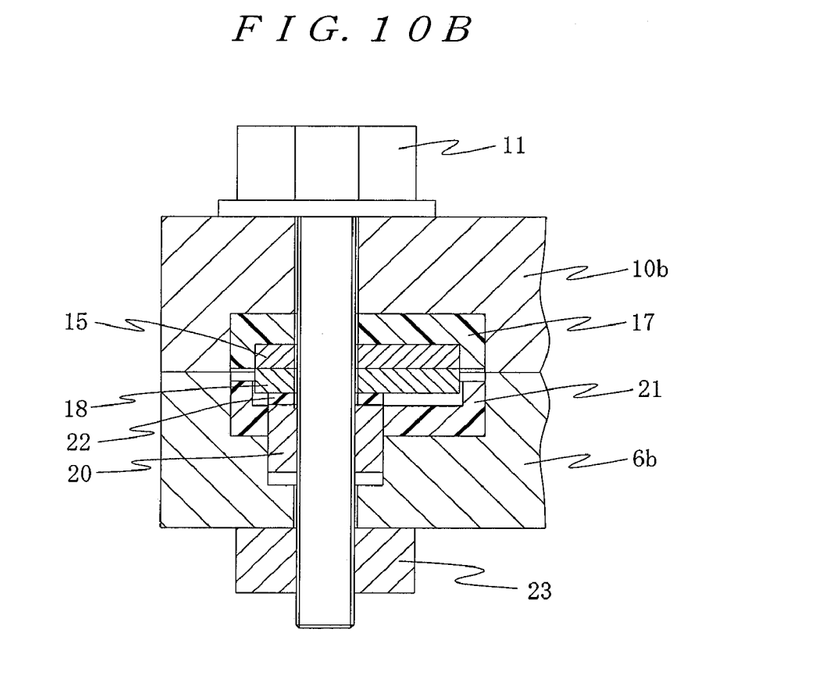
FIG. 10B is a view illustrative of a state where a motor flange of the electric motor and a motor mounting flange of a housing are joined by multiple motor securing bolts and motor securing nuts.

After the control unit side connection terminal 18 is brought into face contact with the motor side connection terminal 15, the motor mounting flange 6b of the housing 6 and the motor flange 10b of the electric motor 10 are fastened with the motor securing bolts 11 and the motor securing nuts 23, as illustrated in FIG. 10B. Then, the motor flange 10b of the electric motor 10 is joined with the motor mounting flange 6b of the housing 6.

Therefore, in the first embodiment described heretofore, the external wiring such as a harness is unnecessary, when the electric motor 10 and the motor control unit 14 are electrically connected. This allows the electrical connection between the electric motor 10 and the motor control unit 14 with ease and the assembling process to be simplified.

This also eliminates the necessity of proving the space where the motor side connection terminal 15 is brought into face contact with the control unit side connection terminal 18, thereby suppressing the electrical connection between the electric motor 10 and the motor control unit 14 from influencing to assembling of any other part. Additionally, a cover for covering the control unit side connection terminal 18 is eliminated, thereby suppressing the increase in the number of parts. Further, the motor side connection terminal 15 and the control unit side connection terminal 18 do not interfere with any other part, thereby improving the layout performance.

Moreover, the motor side connection terminal 15 does not protrude from the housing side end surface of the motor flange 10b, or the control unit side connection terminal 18 does not protrude from the motor side end surface of the motor mounting flange 6b, thereby allowing the core adjusting operation of the electric motor 10 with ease by moving the electric motor 10 in the circumferential direction.

When the motor securing bolt 11, through which the bolt insertion through hole 16 of the motor side connection terminal 15 and the through hole 19 of the control unit side connection terminal 18 are inserted, is screwed into the nut 20 for terminal pressure contact, buried in the motor mounting flange 6b of the housing 6, the control unit side connection terminal 18 is moved to the motor side end surface side of the motor mounting flange 6b and is brought into pressure contact with the motor side connection terminal 15. This enables the electrical connection between the electric motor 10 and the motor control unit 14 with ease.

In the first embodiment of the present invention described heretofore, the motor side connection terminal 15 (the control unit side connection terminal 18) is kept in a non-contact state with respect to the motor securing bolt 11. However, an insulating bush may be interposed between the motor side connection terminal 16 (the through hole 19) and the motor securing bolt 11, for insulation, with certainty. In addition, insulating coating may be applied to the inner circumferential surface of the motor side connection terminal 16 (the through hole 19), or the motor securing bolt 11 may be made of an insulating member. The point is that any configuration may be employed as far as the motor side connection terminal 15 (the control unit side connection terminal 18) is insulated from the motor securing bolt 11 with certainty.

In the first embodiment of the present invention described heretofore, the control unit side connection terminal 18, the nut 20 for terminal pressure contact, and the insulating washer 22 are arranged to be movable in the axial direction of the electric motor 10. However, the control unit side connection terminal 18, the nut 20 for terminal pressure contact, and the insulating washer 22 may be securely installed at the motor mounting flange 6b.

In addition, in the first embodiment of the present invention described heretofore, the control unit side connection terminal 18 is arranged to be movable in the axial direction of the electric motor 10. However, the motor side connection terminal 15 may be arranged to be movable in the axial direction of the electric motor 10.

Figure 11A:
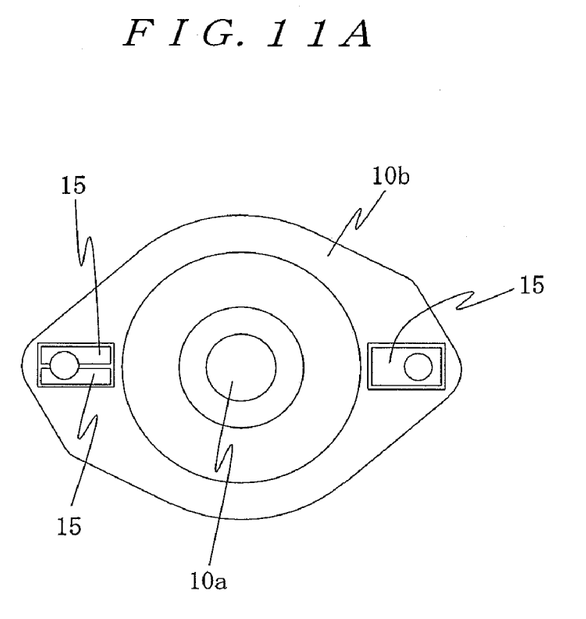
FIG. 11A is a view illustrative of a motor side connection terminal arranged at the motor flange of the electric motor.
Figure 11B:
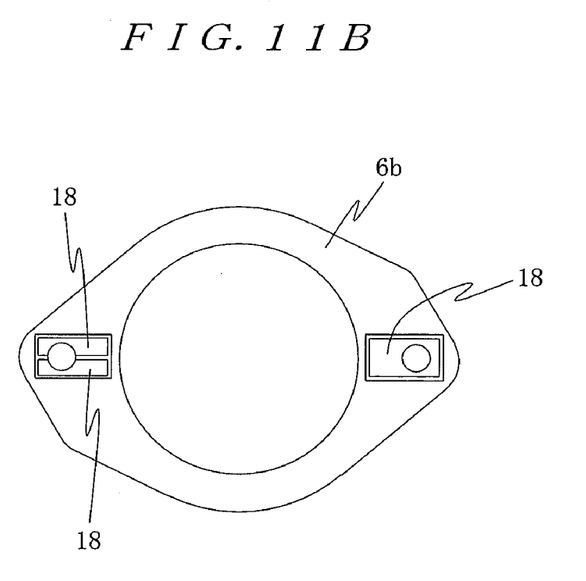
FIG. 11B is a view illustrative of a control unit side connection terminal arranged at the motor mounting flange of the housing.

Furthermore, in the first embodiment of the present invention described heretofore, a two-phase alternating current motor is employed as an electric motor. However, as a second embodiment of the present invention as illustrated in FIG. 11A and FIG. 11B, three motor side terminals 15 electrically connected with a three-phase alternating current brushless motor are arranged at the motor flange 10b so as not to protrude from the housing side end surface of the motor flange 10b, and in addition, three control unit side connection terminals 18 electrically connected with the motor control unit are arranged at the motor mounting flange 6b so as to be in face contact with the motor side connection terminal 15. This allows a three-phase alternating current brushless motor to be employed as an electric motor installed on the housing.

Moreover, in the first embodiment of the present invention described above, the electric power steering device provided with the column tube 2 is applied to the present invention. However, for example, an electric power steering device of pinion type may be applicable to the present invention.

INDUSTRIAL APPLICABILITY

In an electric power steering device according to the present invention, any type of external wiring such as a harness or the like is unnecessary when an electric motor and a motor control unit are electrically connected, thereby establishing the electrical connection between the electric motor and the motor control unit with ease. In addition, it is unnecessary to provide a space where a motor side connection terminal and a control unit side connection terminal are in face contact with each other, thereby suppressing the electrical connection between the electric motor and the motor control unit from influencing to assembling of any other part. Furthermore, a cover for covering the control unit side connection terminal is not necessary any longer, thereby suppressing the increase in the number of parts. Moreover, the motor side connection terminal and the control unit side connection terminal do not interfere with another part, thereby improving the layout performance.

Additionally, the motor side connection terminal does not protrude from a housing side end surface of a motor flange, or the control unit side connection terminal does not protrude from a motor side end surface of a motor mounting flange, thereby allowing the core adjusting operation with ease by rotating the electric motor in a circumferential direction.

Also, when a motor securing bolt is fastened, a nut buried in the motor mounting flange is moved in the axial direction of the motor. This causes the control unit side connection terminal to be in pressure contact with the motor side connection terminal, thereby making the motor side connection terminal and the control unit side connection terminal to be in face contact with each other with certainty.

The invention claimed is:

1. An electric power steering device comprising:
   a housing having therein a worm gear mechanism that transmits rotary torque of an electric motor to a steering shaft, as a steering assist force;
   a motor control unit that controls the electric motor; and
   a motor flange that fastens the electric motor to a motor mounting flange arranged at the housing with a plurality of motor mounting bolts,
   wherein a motor side connection terminal to be electrically connected to the electric motor is provided at the motor flange,
   wherein a control unit side connection terminal to be electrically connected to the motor control unit is provided at the motor mounting flange so as to be in face contact with the motor side connection terminal,
   wherein a bolt insertion through hole, through which the motor mounting bolt is inserted, is provided at the motor side connection terminal, and
   wherein a through hole is provided at the control unit side connection terminal so that the motor mounting bolt that is inserted through the bolt insertion through hole is screwed into a nut buried in the motor mounting flange.

2. The electric power steering device according to claim 1, wherein the motor side connection terminal is arranged at the motor flange so as not to protrude from a housing side end surface of the motor flange.

3. The electric power steering device according to claim 1, wherein the control unit side connection terminal is arranged at the motor mounting flange so as not to protrude from a motor side end surface of the motor mounting flange.

4. The electric power steering device according to claim 1, wherein an insulating body that electrically insulates the motor flange from the motor side connection terminal is provided at the motor flange, and
   wherein another insulating body that electrically insulates the motor mounting flange from the control unit side connection terminal is provided at the motor mounting flange.

5. The electric power steering device according to claim 4, wherein any one of the motor side connection terminal and the control unit side connection terminal is arranged to be movable in axial direction of the electric motor.

6. The electric power steering device according to claim 1, wherein the control unit side connection terminal and the nut are arranged to be movable in axial direction of the electric motor.

7. The electric power steering device according to claim 2, wherein the control unit side connection terminal is arranged at the motor mounting flange so as not to protrude from a motor side end surface of the motor mounting flange.

8. The electric power steering device according to claim 2, wherein an insulating body that electrically insulates the motor flange from the motor side connection terminal is provided at the motor flange, and
   wherein another insulating body that electrically insulates the motor mounting flange from the control unit side connection terminal is provided at the motor mounting flange.

9. The electric power steering device according to claim 3, wherein an insulating body that electrically insulates the motor flange from the motor side connection terminal is provided at the motor flange, and
   wherein another insulating body that electrically insulates the motor mounting flange from the control unit side connection terminal is provided at the motor mounting flange.

10. The electric power steering device according to claim 4, wherein a bolt insertion through hole, through which the motor mounting bolt is inserted, is provided at the motor side connection terminal, and
    wherein a through hole is provided at the control unit side connection terminal so that the motor mounting bolt that is inserted through the bolt insertion through hole is screwed into a nut buried in the motor mounting flange.

11. The electric power steering device according to claim 10, wherein any one of the motor side connection terminal and the control unit side connection terminal is arranged to be movable in axial direction of the electric motor.

* * * * *